Dec. 5, 1967     A. D. DE SHANO     3,356,365
CARROUSEL WITH RELATIVELY MOVABLE TRACK SUPPORTING
CAM MEMBERS FOR SELECTIVELY CHANGING
THE TRACK UNDULATIONS
Filed Oct. 29, 1963     3 Sheets-Sheet 1

INVENTOR.
ALPHONSE D. DeSHANO
BY
*Kenney & Schenk*
ATTORNEYS

Dec. 5, 1967  A. D. DE SHANO  3,356,365
CARROUSEL WITH RELATIVELY MOVABLE TRACK SUPPORTING
CAM MEMBERS FOR SELECTIVELY CHANGING
THE TRACK UNDULATIONS
Filed Oct. 29, 1963  3 Sheets-Sheet 2
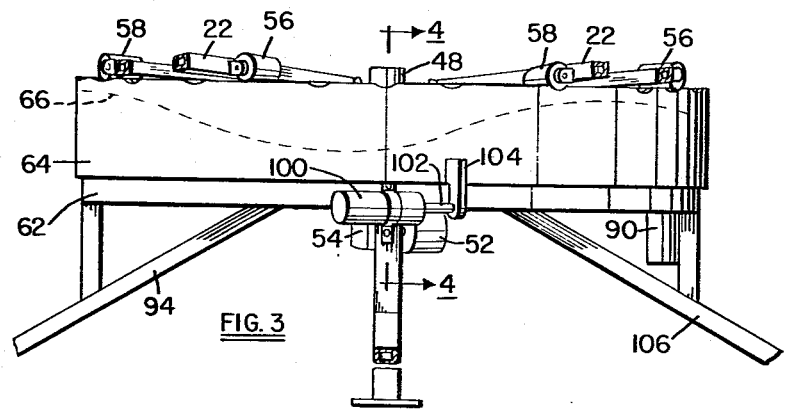
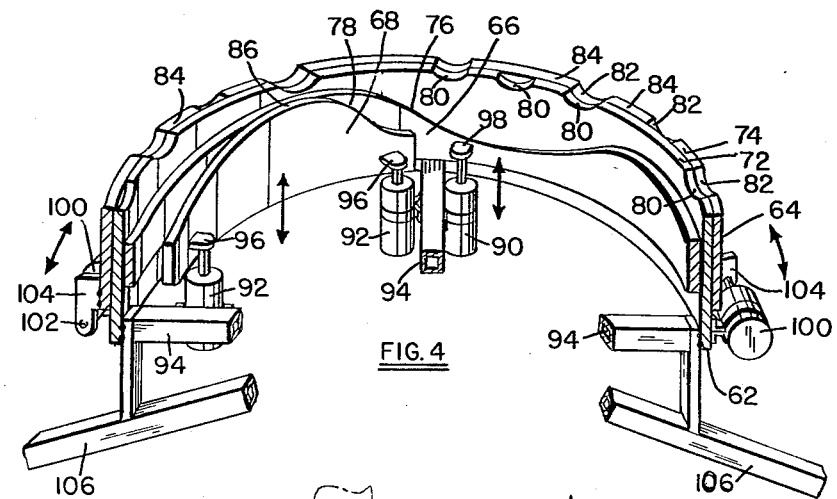
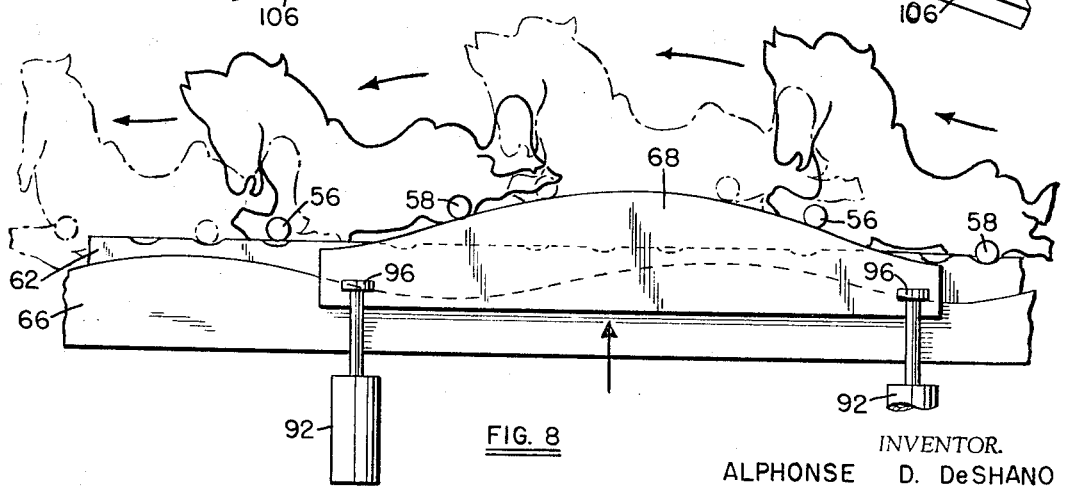
INVENTOR.
ALPHONSE D. DeSHANO
BY
*Kinney and Schenk*
ATTORNEYS

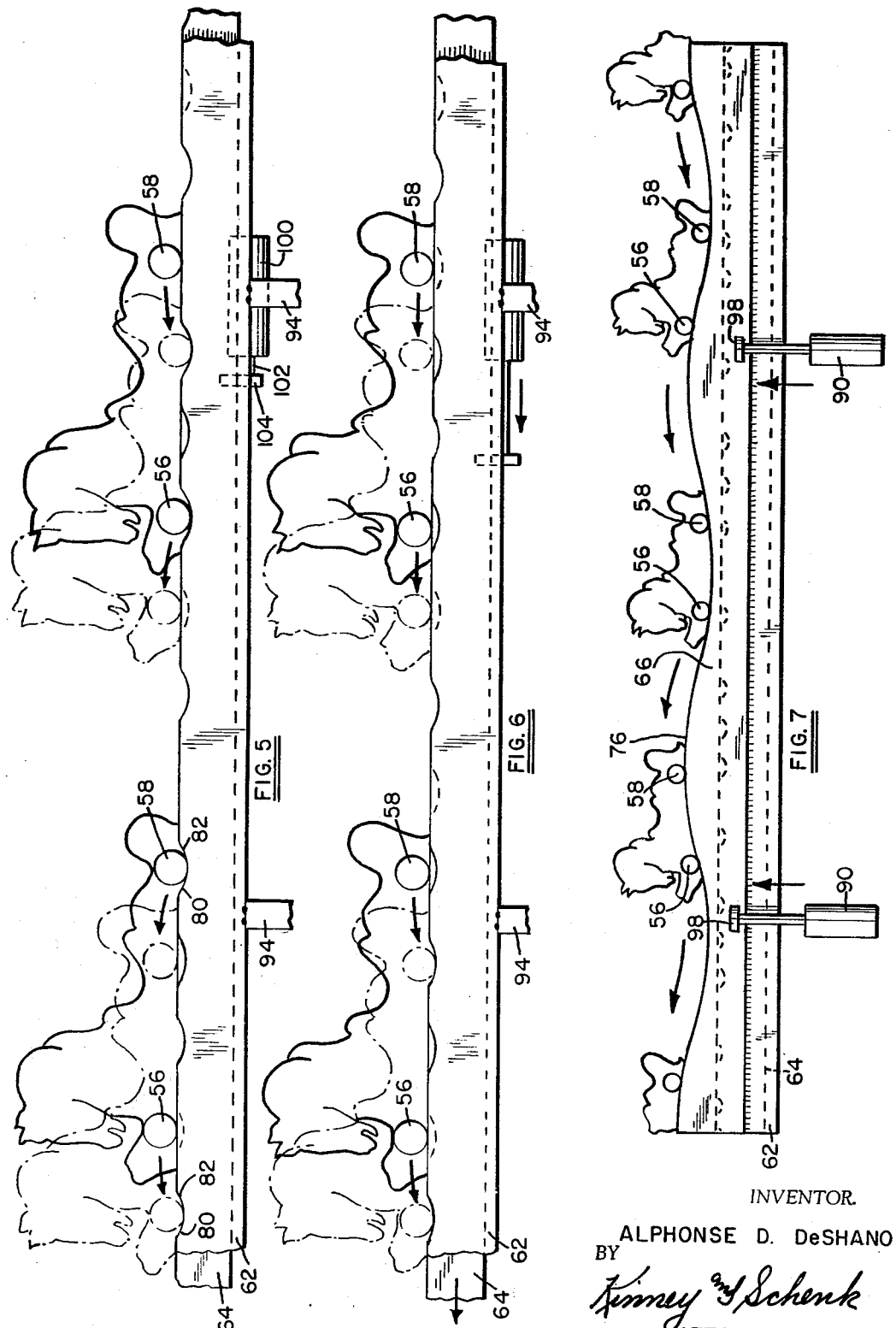

United States Patent Office 3,356,365
Patented Dec. 5, 1967

3,356,365
CARROUSEL WITH RELATIVELY MOVABLE TRACK SUPPORTING CAM MEMBERS FOR SELECTIVELY CHANGING THE TRACK UNDULATIONS
Alphonse D. De Shano, 950 Noyes Ave., Hamilton, Ohio 45015
Filed Nov. 29, 1963, Ser. No. 326,905
13 Claims. (Cl. 272—36)

This invention relates to a carrousel, or merry-go-round, wherein the carriages to be ridden are imitations of horses or ponies.

An object of the invention is to provide means in a carrousel of the type mentioned, whereby the gait of the horses or ponies may be altered while the carrousel is in operation.

Another object of the invention is to provide gait-changing means for the animals of a carrousel, which is simple, durable, and effective, as well as safe in operation.

A further object of the invention is to provide means in association with a carrousel, whereby the animals to be ridden may be caused to walk, trot, gallop, or jump, under the control of an attendant and while the animals travel in a circular path.

The foregoing and other objects are attained by the means described herein and as illustrated upon the accompanying drawings, in which:

FIG. 3 is a side elevation of the same, parts being broken away.

FIG. 4 is a cross-section taken on line 4—4 of FIG. 3, the view being partly in perspective.

FIG. 5 is a developed view, showing a relationship of parts inducing a walking motion of the animals.

FIGS. 6, 7 and 8 are views similar to FIG. 5, showing the parts in position to induce trotting, galloping, and jumping movements, respectively, of the animals.

Figures 1, 2:
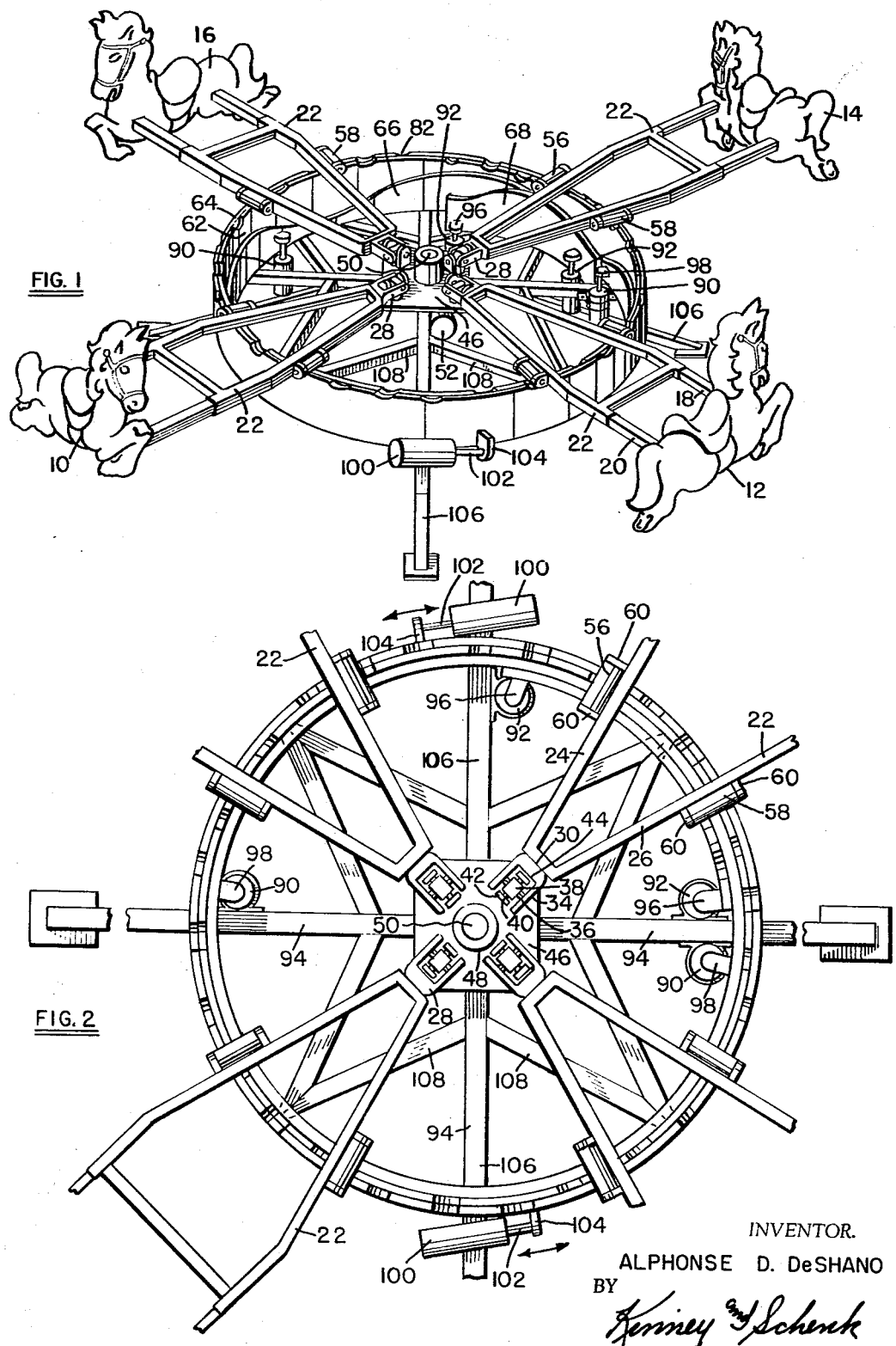
FIG. 1 is a perspective view of a carrousel embodying the improvements of the present invention.
FIG. 2 is a plan view of the same, parts being broken away.

In the drawings, animals such as horses or ponies to be mounted and ridden by a child or patron, are indicated by the characters 10, 12, 14 and 16. The number of animals shown is representative only, and may be increased or decreased in the construction of the carrousel.

Each animal may have extending from one side, a pair of parallel rigid support bars 18 and 20, said bars being detachably but rigidly connected to a rocker frame 22 in any suitable manner, whereby the several animals may be replaced by others if repairs or redecorating are deemed necessary.

Each rocker frame may consist of a pair of divergent arms 24 and 26, terminating at an inner apex where a U-shaped head 28 may be rigidly fixed thereto at 30, as by welding or other appropriate securing means. The head may include spaced parallel arms 34, which support opposite ends of a horizontal stud shaft 36 that passes through a swivel block 38, whereby the rocker frame may have limited vertical bodily movement about shaft 36 as a pivot.

Block 38 carries also a radially disposed stud shaft 40, opposite ends of which may be journalled in spaced parallel upright lugs 42 and 44, which lugs are fixed atop a rotor 46. The rotor may be in the form of a flat metallic plate as shown, having a central bored hub 48 receptive of a vertical drive shaft 50. Shaft 50 is adapted for rotation by means of a motor 52 and a speed reducer 54, to impart slow rotation to plate or rotor 46 and the several frames 22 thereto attached. By this means, the several carriages 10, 12, 14 and 16 are advanced along a circular orbit.

Each rocker frame 22 carries a pair of rollers 56 and 58, the rollers being rotatably supported in bearing lugs 60 carried by the frame arms 24 and 26. Such rollers perform as cam followers riding upon the upper edge of a circular cam assembly, as will be explained.

Referring particularly to FIG. 4, the circular cam assembly is shown to comprise a stationary main cam member 62 of circular formation, an exterior rotationally shiftable cam member 64 slidably surrounding the main cam member, and other cam members 66 and 68 arranged inside the circular main cam member 62. The inside cam members 66 and 68 are adapted for bodily shiftability vertically, whereas exterior cam member 64 is adapted for limited shiftability about member 62, in a horizontal plane.

The fixed cam member 62 has an upper track 72, exterior cam member 64 has an upper track 74, and cam members 66 and 68 have upper tracks 76 and 78; respectively. The rollers 56 and 58 of rocker frames 22, may ride upon the upper track of any cam member which may be exposed thereto, and such undulations as are carried by the cam tracks will of course be transmitted to the rocker frames, giving motion to the horses carried by the frames.

By presenting differently designed cam tracks to the rollers or followers 56 and 58, the horses of the several rocker frames may be caused to move in simulation of a walk, a trot, a gallop, or a jump, as rotor 46 is activated by motor 52. To achieve these movements, fixed cam member 62 may have its upper track 72 provided with a succession of depressions 80, into which the followers 56 and 58 may fall as the rocker frames revolve about shaft 50. Other depressions 82 of cam member 64, may be placed into and out of registry with depressions 80, by bodily shifting the cam member 64 to a limited extent, rotationally about fixed cam member 62.

Some of the depressions 82 are preferably in staggered relation to depressions 80, so that by slightly rotating the cam member 64, different characteristic motions of the frames 22 and the horses thereon, may be achieved to simulate the walk and the trot of a horse. Moreover, cam member 64 may be so disposed as to register its elevated portions 84 with all the depressions 80 of cam member 62, thereby to provide a continuous level track for the rocker frames to travel on, without producing undulatory rocking of the frames.

When it is desired that the horses change gait to a gallop, it is necessary only to bodily elevate the cam member 66 to a position at which its track 76 assumes a dominating position above tracks 72, 74, and 78, whereupon the long sweeping undulations of track 76 will impart movements to the rocker frames and their horses in simulation of the gallop.

The track 78 of cam member 68 is characterized by a single high hump 86, and when this cam member is placed in dominant position above tracks 72, 74, 76, it performs to tilt and elevate the horses in simulation of a jump. The jump cam 68 by preference is of limited length, and need not be coextensive with cam members 62, 64, 66, which preferably are circular or ring-shaped. If at any time the patrons or riders of the carrousel are frightened by the simulated jump, the cam member 68 would be maintained in the lowered inoperative position of FIG. 4, beneath the level of the other cam tracks.

Elevating and lowering of the cam members 66 and 68 may be performed in any suitable manner, for example by means of pneumatic or hydraulic cylinders 90, 90 and 92, 92, under the control of an attendant or possibly under the control of a cyclic automatic operator. In the case of cam member 68, the cylinders 92—92 may be rigidly supported upon the frame members 94 of the carrousel, with their piston rods disposed vertically to engage fixed lugs 96 on the cam member. An attendant by opening and closing a control valve at his operating station, may direct fluid under pressure to and from the cylinders, for bodily elevating the cam member 68 to the operative position of FIG. 8, or lowering it to the inoperative position of FIG. 4. As will be understood, cylinders 92—92 are to operate in unison, so as to maintain always a level condition of cam member 68.

In like manner, the operating cylinders 90—90 may be supported rigidly by frame 94, with the piston rods thereof operative upon fixed lugs 98 of cam member 66, to bodily elevate and lower said cam member. The lowered inoperative position of this cam member 66 is illustrated by FIGS. 1, 3, 4 and 8, and the elevated operative position appears in FIG. 7, which indicates also several positions of a horse at gallop gait.

The ring-shaped cam member 64, as previously mentioned, surrounds cam member 62 and may be shifted relative thereto in a horizontal plane. Such shifting of cam member 64 may be performed by one or more hydraulic or pneumatic cylinders 100 fixed relative to member 62, and having a horizontally disposed piston rod 102 adapted to push or pull cam member 64 rotationally relative to fixed cam member 62. Piston rod 102 for this purpose may have its outer end fixed to a lug 104, which lug is welded or otherwise fixed to cam member 64. The cylinder or cylinders 100 may be of the double-acting type, and the piston rod movements thereof may be controlled by a fluid control valve located at the operator's station.

Depending upon the extent to which piston rod moves the cam member 64, the horses of the carrousel may be caused to walk, trot, or merely advance smoothly along the cam track without perceptible rocking motion. Thus, as in FIG. 5, certain depressions 80 and 82 of cam members 62 and 64 may be placed in registry, to cause the front and rear end of an advancing horse to tilt in succession, for simulating the walk gait. Alternatively, as in FIG. 6, certain of the depressions may be placed in registry causing both ends of the horse to drop simultaneously, thereby simulating the trot. At a third position of adjustment of cam member 64, all of the depressions of tracks 72 and 74 may be staggered relative to one another, to provide in effect a smooth or uninterrupted upper cam track inducing no tilting or rocking movements of the horses.

The reference numerals 106 indicate structural members of the carrousel frame-work serving as supporting legs. Reinforcing braces or struts are indicated at 108.

The device may be either permanently constructed, or assembled with the use of separable fasteners permitting ready disassembly for transport from place to place. The number of riders to be accommodated is of course a matter of choice, and dependent upon the size of the frame and the number of carriages to be provided.

It is to be understood that various modifications and changes may be made in the structural details of the device, within the scope of the appended claims, without departing from the spirit of the invention.

What is claimed is:

1. A carrousel comprising in combination: a rotor, a plurality of rocker frames each extending radially outwardly from the rotor, said frames each having an inner end and an outer end, swivel means connecting the inner ends of the frames to the rotor for movement therewith in a circular orbit, a carriage imitating a riding animal attached to an outer end of each frame, a pair of spaced cam followers on each frame intermediate the ends thereof, a stationary circular cam member concentric with the rotor axis and having a track to support the cam followers of the frames, a movable circular cam member concentric with the stationary cam member and disposed in close proximity thereto, said movable cam member having an undulatory track thereon, and means for shifting the movable cam member relative to the stationary cam member, for selectively placing the undulatory track in a dominating position relative to the stationary cam member track, for alternate support of the cam followers.

2. A carrousel as set forth in claim 1, wherein the shifting means for the movable cam member includes means operative while the carriages are traveling in orbit, to present either of the the cam tracks to the followers selectively.

3. A carrousel comprising in combination, a rotor, a plurality of rocker frames each extending radially outwardly from the rotor, said frames each having an inner end and an outer end, swivel means connecting the inner ends of the frames to the rotor for movement therewith in a circular orbit, a carriage imitating a riding animal attached to an outer end of each frame, a pair of spaced cam followers on each frame intermediate the ends thereof, a stationary circular cam member concentric with the rotor axis and having a track to support the cam followers as the followers may drop as the followers traverse the track, a movable circular cam member concentric with the stationary cam member and disposed in close proximity thereto, said movable cam member having a track disposed at the level of the track first mentioned, the track of the movable cam member including a series of spaced depressions dimensioned to accommodate the followers, and means operative concurrently with orbiting of the carriages, for effecting limited shifting of the movable cam member relative to and in the mean plane of the stationary cam member, for registering certain depressions of one cam member with certain depressions of the other cam member, to determine motion characteristics of the frames and carriages as the followers traverse the cam member tracks.

4. The carrousel as set forth in claim 3, wherein the combination includes means to displace the depressions of the movable cam member track out of registry with the depressions of the stationary cam member track.

5. A carrousel comprising in combination, a rotor, a plurality of rocker frames each extending radially outwardly from the rotor, said frames each having an inner end and an outer end, swivel means connecting the inner ends of the frames to the rotor for movement therewith in a circular orbit, a carriage imitating a riding animal attached to an outer end of each frame, a pair of spaced cam followers on each frame intermediate the ends thereof, a stationary circular cam members concentric with the rotor axis and having a track to support the cam followers as the frames move with the rotor, said track having therein a series of spaced depressions into which the followers may drop as the followers traverse the track, a movable circular cam member concentric with the stationary cam member and disposed in close proximity thereto, said movable cam member having a track disposed at the level of the stationary cam member track, the track of the movable cam member including a series of spaced depresisons to accommodate the followers, means operative concurrently with orbiting of the carriages, for effecting limited shifting of the movable cam member relative to and in the mean plane of the stationary cam member, the depressions of the cam member tracks being so arranged that in one shifted position of the movable cam member, the depressions thereof coact with track portions of the stationary cam member to impart a walking gait movement to the carriages by action of the cam followers traversing the cam tracks, and in a second shifted position of the movable cam member, the depressions thereof coact with track portions of the stationary cam member to impart a trot gait movement to the carriages by action of the cam followers, a third circular cam member concentric with and in close proximity to the stationary cam member, said third cam member having an undulatory track presentable to the cam followers for imparting to the carriages a simulated gallup gait, and means operative concurrently with orbiting of the carriages, for bodily shifting the third cam member to a dominating position at which the cam followers ride wholly upon the undulatory track of the third circular cam member.

6. The carrousel as set forth in claim 5, wherein the combination includes an arcuate movable cam section substantially concentric with the stationary cam member, and comprises a track having a decided hump presentable to the cam followers for imparting to the carriages a simulated jump, and means operative concurrently with orbiting of the carriages, for bodily shifting the humped cam section selectively into position for diverting the cam followers from the path established by the cam members previously mentioned.

7. A carrousel comprising in combination, a rotor, a plurality of rocker frames each extending radially outwardly from the rotor, said frames each having an inner end and an outer end, swivel means connecting the inner ends of the frames to the rotor for movement therewith in a circular orbit, a carriage imitating a riding animal attached to an outer end of each frame, a pair of spaced cam followers on each frame intermediate the ends thereof, a stationary circular cam member concentric with the rotor axis and having an upper track to support the cam followers as the frames move with the rotor, said track having therein a series of spaced depressions into which the followers may drop as the followers traverse the track, a movable cam member concentrically related to the stationary cam member and disposed in close proximity thereto, said movable cam member having a track disposed at the level of the track first mentioned, the track of the movable cam member including a series of spaced depressions to accommodate the followers, and means operative while the carriages are orbiting, for rotationally shifting the movable cam member relative to and in the mean plane of the stationary cam member, for registering certain depressions of the movable cam member with various areas of the track of the stationary cam member, to establish motion characteristics of the frames and carriages as the followers traverse the cam member tracks, and an arcuate vertically movable cam section substantially concentric with the stationary cam member, said vertically movable cam section including an upper track having a decided hump presentable to the cam followers for imparting to the carriages a simulated jump, and means selectively operative while the carriages are orbiting, for bodily elevating the hump of the vertically movable cam section above the tracks of the stationary and movable cam sections first mentioned, to alter the course of travel of the cam followers.

8. The carrousel as set forth in claim 7, wherein the means for rotationally shifting the movable cam member and for vertically shifting the movable arcuate cam section, include compressed fluid motors under the control of an operating attendant.

9. A carrousel comprising in combination: a supporting framework, a rotor supported thereon for rotation about a vertical axis, and a drive means for the rotor, at least one rocker frame having divergent arms and an apex portion, swivel means connecting the apex portion to the rotor with the arms extended outwardly from the rotor to describe a circle as the rotor rotates, a carriage imitating a riding animal attached to the outer ends of the arms, and a cam follower on each arm disposed intermediate the outer ends and the apex portion of the rocker frame, a stationary circular cam ring supported horizontally by the framework in concentric relation to the rotor axis, said cam ring having an upper track to support the cam followers of the frame, said track having a series of spaced depressions into which the followers may drop as the followers traverse the track, a horizontal movable cam ring closely surrounding the stationary cam ring, said movable cam ring including an upper track level with the track of the stationary cam ring, and said track of the movable cam ring having a series of spaced depressions to accommodate the followers, a fluid motor fixed to the framework in horizontal position and including a piston rod extendable and retractable by fluid pressure delivered to the motor, said piston rod having an outer end anchored to the movable cam ring for shifting said cam ring rotationally about the stationary cam ring and thereby rearranging the depressions of the movable cam ring track relative to the depressions of the stationary cam ring track, thereby to alter the motion characteristics of the cam followers and the carriages carried by the rocker frame.

10. The carrousel as set forth in claim 9, wherein the combination includes a third circular cam ring having an undulatory upper cam track, said third ring being closely within and concentric with the stationary cam ring, fluid motor means fixed upon the framework in vertical position and including an upright piston rod having an outer end, means anchoring the outer end of the rod to the third cam ring, for selectively elevating and lowering said third cam ring bodily as fluid under pressure is delivered to the fluid motor means, the range of movement of the piston rod being such as to selectively dispose the undulatory track of the third cam ring wholly above and wholly below the level of the stationary cam ring track.

11. The carrousel as set forth in claim 10, wherein the combination includes a relatively short cam section having a severely humped upper track, and selectively operative fluid motor means associated therewith to elevate and lower said humped track within range of the rocker frame followers, said humped track being movable to positions above and below the levels of the tracks of the several circular cam rings aforesaid.

12. A carrousel comprising in combination: a supporting framework, a rotor supported thereon for rotation about a vertical axis, and a drive means for the rotor, at least one rocker frame having divergent arms and an apex portion, swivel means connecting the apex portion to the rotor with the arms extended outwardly from the rotor to describe a circle as the rotor rotates, a carriage imitating a riding animal attached to the outer ends of the arms, and a cam follower on each arm disposed intermediate the outer ends and the apex portion of the rocker frame, a stationary circular cam ring supported horizontally by the framework in concentric relation to the rotor axis, said cam ring having an upper track to support the cam followers of the frame, said track having a series of spaced depressions into which the followers may drop as the followers traverse the track, a horizontal movable cam ring closely surrounding the stationary cam ring, said movable cam ring including an upper track level with the track of the stationary cam ring, and said track of the movable cam ring having a series of spaced depressions to accommodate the followers, a fluid motor fixed to the framework in horizontal position and including a piston rod extendable and retractable by fluid pressure delivered to the motor, said piston rod having an outer end anchored to the movable cam ring for shifting said movable cam ring rotationally about the stationary cam ring and thereby rearranging the depressions of the movable cam ring track relative to the depressions of the stationary cam ring track, and a relatively short cam section having a severely humped upper track, said relatively short cam section being curved to the arcuacy of the stationary cam ring and disposed substantially against the latter interiorly thereof, and selectively operative means associated with the short cam section, to elevate and lower the same within a range for disposition of the humped track wholly above and wholly below the levels of the tracks of the circular cam rings.

13. The carrousel as set forth in claim 12, wherein the means to elevate and lower the short cam section includes at least one fluid motor operative independently of the fluid motor for shifting the movable cam ring.

(References on following page)

References Cited

UNITED STATES PATENTS

| | | | |
|---|---|---|---|
| 1,034,654 | 8/1912 | Smith | 272—44 |
| 1,127,361 | 2/1915 | Johnson | 272—40 |
| 2,792,224 | 5/1957 | White | 272—44 X |
| 3,149,838 | 9/1964 | Seidner | 273—43 |

FOREIGN PATENTS 1,318,712 1/1963 France.

ANTON O. OECHSLE, *Primary Examiner.*

RICHARD C. PINKHAM, *Examiner.*

F. B. LEONARD, A. W. KRAMER,
*Assistant Examiners.*